(12) United States Patent
McKinley

(10) Patent No.: US 7,805,733 B2
(45) Date of Patent: Sep. 28, 2010

(54) SOFTWARE IMPLEMENTATION OF HARDWARE PLATFORM INTERFACE

(75) Inventor: David James McKinley, Cypress, TX (US)

(73) Assignee: Augmentix Corporation, Austin, TX (US)

( * ) Notice: Subject to any disclaimer, the term of this patent is extended or adjusted under 35 U.S.C. 154(b) by 1308 days.

(21) Appl. No.: 11/324,731

(22) Filed: Dec. 30, 2005

(65) Prior Publication Data

US 2007/0157158 A1   Jul. 5, 2007

(51) Int. Cl.
*G06F 13/00* (2006.01)
(52) U.S. Cl. .................. 719/320; 719/328; 718/104; 709/217; 709/225; 709/226; 707/999.001; 707/999.009
(58) Field of Classification Search ............ 719/320, 719/328; 718/104; 709/217, 225, 226; 707/1, 707/9, 999.001, 999.009
See application file for complete search history.

(56) References Cited

U.S. PATENT DOCUMENTS 7,272,550 B2 *  9/2007  Chen et al. ................. 703/27
2007/0067769 A1 *  3/2007  Geisinger ................... 718/1
2007/0100967 A1 *  5/2007  Smith et al. ............... 709/219

* cited by examiner

*Primary Examiner*—Andy Ho
(74) *Attorney, Agent, or Firm*—Sprinkle IP Law Group

(57) ABSTRACT

A computer program product and a system are provided for implementing the Hardware Platform Interface (HPI) specification for platform management of computer systems. Software, implemented by the computer program product includes a user library, a resource program, a domain program and a bridge program. The user library accepts calls from user application programs for accessing management data and management capabilities incorporated in a running instance of the resource program. The running instance of the resource program provides access to the management data and the management capabilities. This access is through restrictions to a set of running instances of the domain program. In addition, access to the user application programs is indirect through a set of running instances of the domain program. A running instance of the domain program provides access of a set of running instances of the resource program to a predefined set of user application programs, based on access restrictions defined for the domain program. The bridge program enables communication with remotely-connected computer systems.

17 Claims, 5 Drawing Sheets

SOFTWARE IMPLEMENTATION OF HARDWARE PLATFORM INTERFACE

BACKGROUND

The present invention generally relates to platform management of computer systems, and relates more specifically to the implementation of the Hardware Platform Interface (HPI) specification that is used for the platform management of computer systems.

Modern integrated computer systems provide multiple services like voice and data transmission, system management, security, wireless communication, video conferencing, web services, etc. These computer systems are assembled using various hardware and software components, better known in the industry as Commercial-off-the-shelf (COTS) components, which are sourced from multiple vendors. These computer systems provide services to the users even when hardware and software faults occur and the COTS components are upgraded. The Service Availability Forum (SAF), an industry consortium of telecommunication and computer equipment manufacturers and users, provides specifications that provide open standards for high-availability computer systems, including the Hardware Platform Interface (HPI) specification for platform management of computer systems.

An interface implemented in accordance with the HPI specification enables the use of the COTS components to construct the high-availability computer systems. These high-availability computer systems can provide uninterrupted services to the users. The interface allows the users to set and retrieve configuration and operational data related to the COTS components. Examples of operational data may include data related to starting up, shutting down, and testing of the COTS components.

The HPI specification enables the modeling of the computer systems in the form of sets of resources and domains. A resource is an abstract representation of a set of management data and management capabilities of the platform of the computer systems. A domain is an abstract collection of resources. Each resource can be a member of one or more domains. The HPI specification requires a user application program to establish a management context with a domain to access any of the management data and management capabilities provided through the set of resources that are members of the domain.

User application programs can monitor and control the computer system by accessing the management capabilities modeled in the set of resources of the domain. Therefore, access restrictions for accessing the set of resources are desirable to restrict unwanted user application programs from controlling the computer system. Moreover, without the access restrictions, unwanted programs running on a computer system can also adversely affect the performance of the computer system.

In implementations of the HPI specification, the user application programs are linked to a library, which provides access to the domains and the resources. The HPI specification does not require the implementation of any access restrictions, and some implementations of the HPI specification may permit any user application program to access the library. In other implementations, access restrictions are defined to make the library accessible only to pre-defined user application programs. However, these access restrictions may only provide a single level of access control. User application programs may either have access to the library and all the management capabilities provided by the domains and resources accessible through the library or have no access at all.

Further, the domains and the resources may be spread over multiple computer systems that are remotely connected by a network. Examples of the network may include Ethernet, Internet Protocol (IP) network, or a wireless network. Access restrictions also have to be implemented over the network.

Conventional mechanisms for implementing access restrictions may include making non-standard calls to the library prior to making standard calls for linking with the library. The standard calls are used for establishing the management context. The non-standard calls, which are not included in the HPI specification, are used to identify the user application programs making these calls. The user application programs can be identified by passing the credentials of the user-application programs to the library for verification before making a standard HPI library call. However, this mechanism does not provide portability of the user application programs on different platforms that implement the HPI specification.

Other conventional mechanisms may include the use of a table maintained by a system administrator for identifying the user application programs. The table can be accessible by the library to enable it to control the access for establishing the management context. However, this mechanism may be difficult to maintain, as the table must be updated whenever new user application programs are introduced in the system.

In view of the foregoing discussion, there is a need for the implementation of the HPI specification that can provide access control. This access control can permit the user application programs to access restricted sets of resources and domains. Moreover, there is a need for an implementation of the HPI specifications that can be portable across different platforms. Further, there is a need for the implementation of the HPI specifications that can provide access to the resources and domains spread over the network of remotely-connected computer systems. The access to the resources and domains spread over the network is also provided, based on the access restrictions.

SUMMARY

An object of the invention is to provide a computer program product and a system for implementing the HPI specification with an access control for platform management of computer systems. The access control restricts access of domains and resources to the user application programs.

Another object of the invention is to provide a computer program product and a system for implementing HPI specification that may be portable across different platforms.

Yet another object of the invention is to provide a computer program product and a system for implementing HPI specification that can provide access to resources and domains spread over a network of remotely-connected computer systems. The access to the resources and domains spread over the network is based on access restrictions.

A computer program product and a system are provided for implementing the HPI specifications for platform management of computer systems. The computer program product implements software that includes various programs for providing various functionalities as defined in the HPI specifications. The software includes a user library, a resource program, a domain program and a bridge program. The user library can have zero or more instances present on one or more computer systems. An instance of the user library can be linked with a user application program. The instance of the user library can accept calls from the user application program. Each of the resource program, domain program and the bridge program can have zero or more instances running on the one or more computer systems. Each running instance of the domain program can provide a pre-defined set of user application programs access to a set of the running instances of the resource program, which in turn provides access to the associated zero or more of a set of management data and a set of management capabilities. The access to the pre-defined set of user application programs is provided on the basis of access restrictions defined for the running instance of the domain program. The set of the running instances of the resource program are configured to be the members of the running instance of the domain program.

Each running instance of the bridge program enables communication with remotely-connected computer systems. The running instance of the bridge program can provide access to zero or more instances of the domain program and zero or more instances of the resource program running on the remotely-connected computer systems. Access restrictions that control the access to the running instance of the bridge program can also be defined. dr

BRIEF DESCRIPTION OF THE DRAWINGS

So that the manner in which the above recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF VARIOUS EMBODIMENTS

Various embodiments of the invention generally relate to platform management of computer systems. More specifically, the embodiments of the invention relate to implementation of Hardware Platform Interface (HPI) specifications used for platform management of computer systems.

Figure 1:
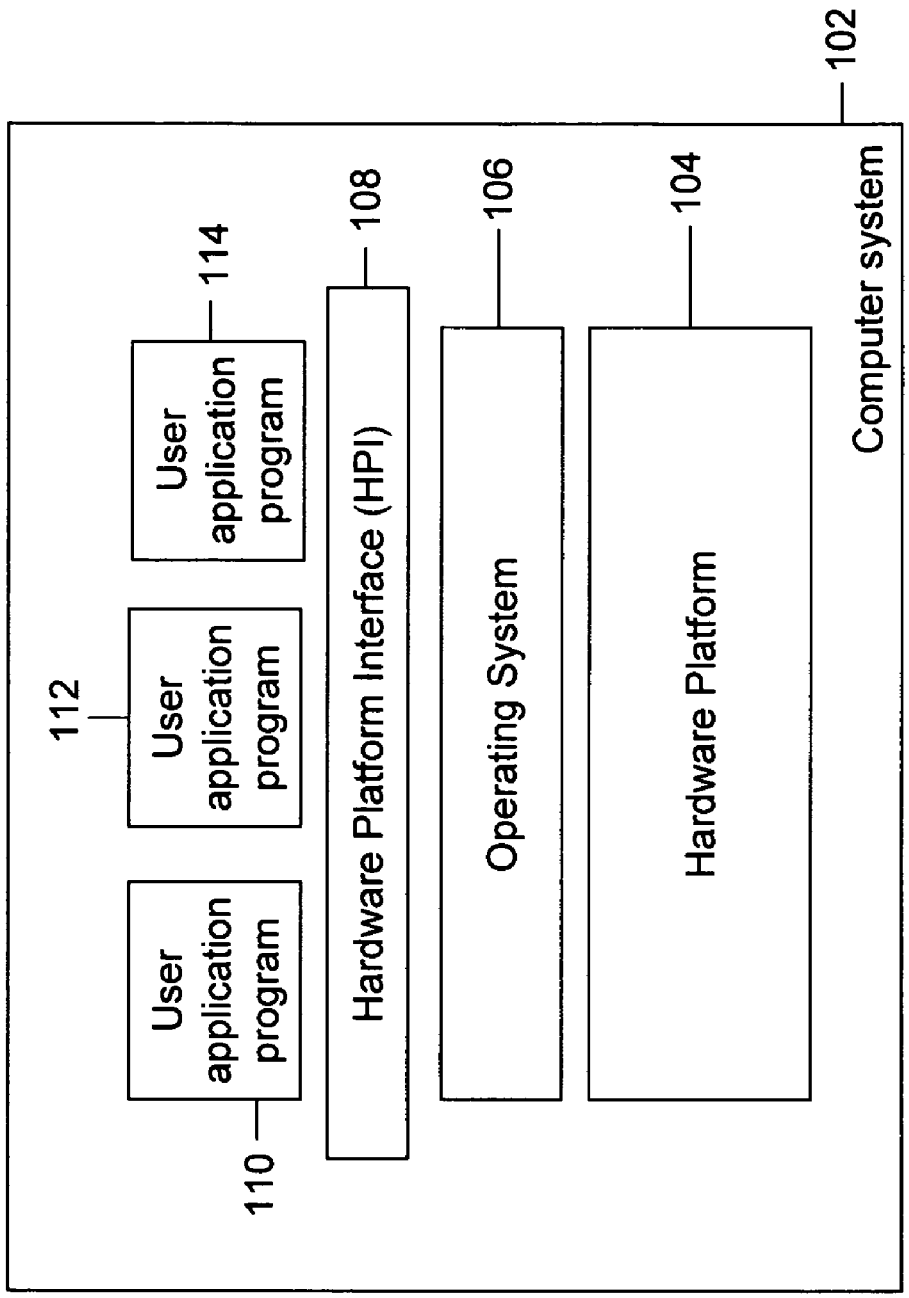
FIG. 1 is a view that illustrates an environment for implementing the Hardware Platform Interface (HPI) specifications for platform management of computer systems, in accordance with an embodiment of the invention.

Embodiments of the invention enable the implementation of the HPI specifications by providing one or more programs that represent different functionalities of resources and domains as defined in the HPI specification. FIG. 1 is a view that illustrates an environment for implementing the HPI specifications for platform management of computer systems. A computer system 102 can include a hardware platform 104 and an operating system 106. Computer system 102 can further include a Hardware platform interface (HPI) 108, and multiple user application programs running on computer system 102. HPI 108 works as an interface between the multiple user application programs and management capabilities required for platform management of computer system 102. Operating system (OS) 106 enables communication among various programs running on computer system 102. HPI 108 provides access of the management capabilities to the multiple user application programs, as defined in the HPI specifications. Examples of the management capabilities may include power control and reset control. The multiple user application programs may include a user application program 110, a user application program 112, and a user application program 114. In one embodiment of the invention, HPI 108 can work as an interface between hardware platform 104 and middleware that implements other related functionalities important in the high-availability computer systems. An example of such middleware would be software that includes an application interface specification (AIS), also defined by the SAF. HPI 108 allows programmers of the middleware and user application programs 110, 112, and 114 to implement the HPI specifications for the platform management of computer system 102, independently of hardware platform 104.

In an embodiment of the invention, there can be multiple hardware platforms. HPI 108 provides the management capabilities for the multiple hardware platforms. In another embodiment of the invention, multiple middleware and multiple user application programs can be present. HPI 108 can be accessed by the multiple middleware and the multiple user application programs. Users can monitor and control the multiple hardware platforms through HPI 108.

The HPI specification for platform management may be implemented by using a domain, which provides access to a set of resources. Each resource in the set of resources can include one or more management instruments that can provide a set of management capabilities. Examples of the management instruments may include sensors, controls, inventory data repositories, watchdog timers, and annunciators. Examples of the management capabilities may include power control, reset control, configuration parameter control, hot-swap management, event generation, and event-log maintenance.

According to various embodiments of the invention, a computer program product is provided that includes a computer program code that implements functionalities of the user library, the domain program, the resource program and the bridge program by means of software. The user library can have zero or more instances present on one or more computer systems. The instance of the user library accepts HPI calls from the user application programs. Each of the resource program, the domain program and the bridge program can also have zero or more instances running on the one or more computer systems. Each running instance of the resource program provides access to zero or more of a set of management data and a set of management capabilities. The access is provided via access restrictions only to a set of the running instances of a domain program directly, and to user application programs only indirectly through the set of the running instances of the domain program. Further, each running instance of the domain program provides access of a set of the running instances of the resource program to a pre-defined set of user application programs. The access is provided if the set of the running instances of the resource program are configured as the members of the running instance of the domain program. The access to the pre-defined set of user application programs is provided based on access restrictions defined for the running instance of the domain program. Furthermore, each running instance of the bridge program enables communication with zero or more remotely-connected computer systems.

In one embodiment of the invention, a system administrator can configure zero or more instances of the user library, zero or more instances of the resource program, zero or more instances of the domain program and zero or more instances of the bridge program to run on a computer system. The zero or more instances of the user library, the zero or more instances of the resource program, the zero or more instances of the domain program, and the zero or more instances of the bridge program can be configured to start and stop execution independently of each other. The instances of the user library, the instances of the domain program, the instances of the resource program and the instances of the bridge programs will hereinafter be referred as user libraries, domain programs, resource programs and bridge programs only.

Figure 2:
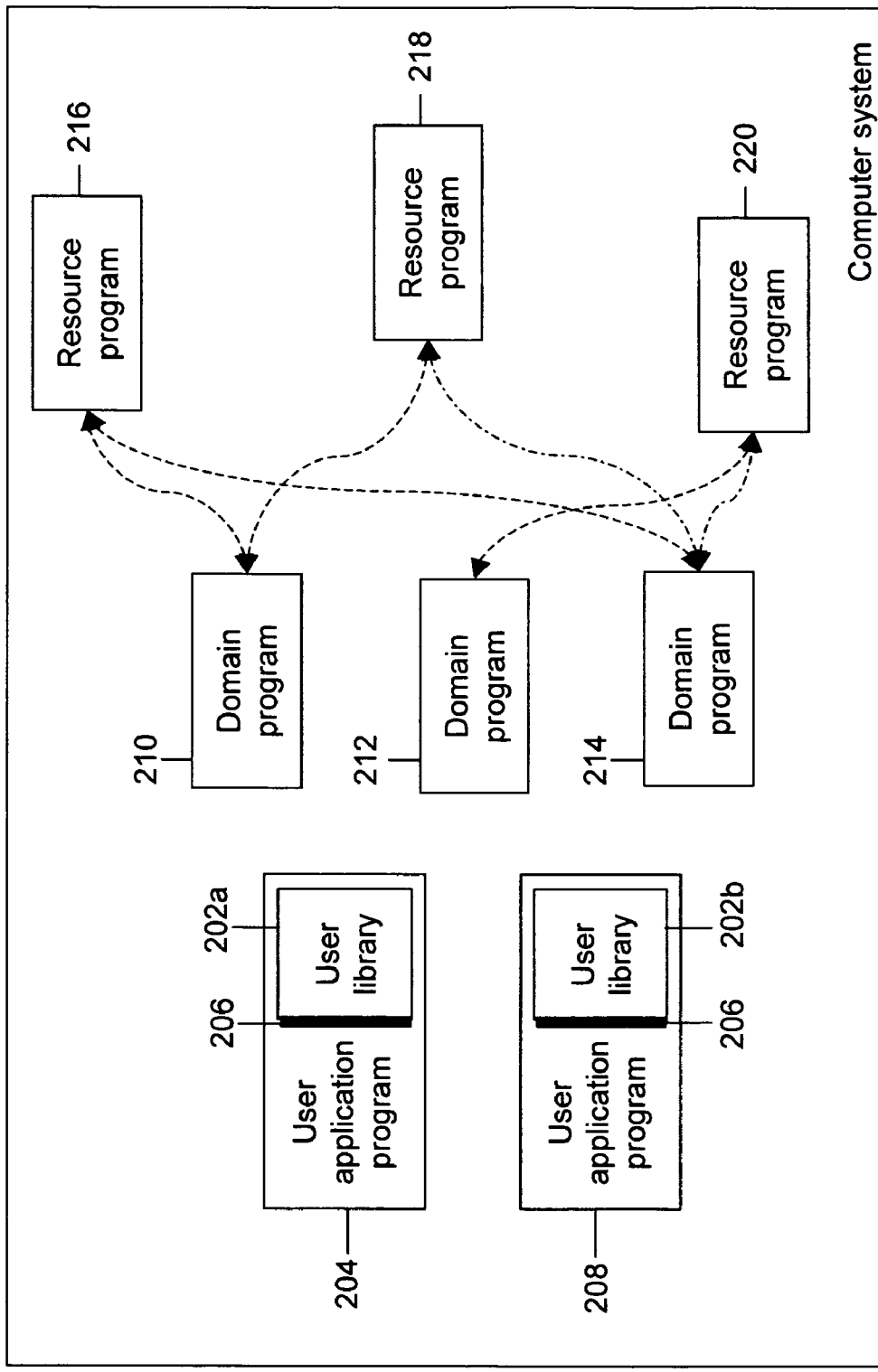
FIG. 2 is a view that illustrates a schematic representation of various programs present in software for implementing the HPI specifications, in accordance with an embodiment of the invention.

FIG. 2 is a view that illustrates a schematic representation of various programs for implementing the HPI specifications, in accordance with an embodiment of the invention. In an embodiment of the invention, a user library 202a in a computer system 200 is linked with a user application program 204 through a HPI 206. User library 202a can accept calls from user application program 204 by means of HPI 206. The calls may be made for accessing the one or more domain programs. In another embodiment of the invention, user library 202b, which is a copy of user library 202a, may be running on computer system 200. User library 202b can be linked with a user application program 208 through HPI 206. User library 202b can accept calls from user application program 208. The calls may be defined as per the HPI specifications. A domain program 210 can provide access of a set of resource programs to a pre-defined set of user application programs. The pre-defined set of user application programs can include user application program 204. The set of resource programs is configured to be the members of domain program 210. In an embodiment of the invention, the set of resource programs can include a resource program 216 and a resource program 218. Likewise a domain program 212 can provide access to a resource program 220 that is configured to be the member of domain program 212. Further, a domain program 214 can provide access to resource programs 216, 218 and 220. Resource programs 216, 218 and 220 can provide access to zero or more of sets of management data and sets of management capabilities that are associated with them. This access to domain programs 210, 212, and 214 is provided directly via access restrictions defined for the domain programs. Further, the access to user application programs 204 and 208 is provided indirectly only through domain programs 210, 212 and 214.

In processing most of the calls made by user application programs, a user library communicates with a domain program and resource programs accessible by the domain program. In one embodiment of the invention, user library 202a communicates with domain program 210 in response to the call made by user application program 204. By communicating with domain program 210, user library 202a can also communicate with resource programs 216 and 218 indirectly. Communications between domain programs and resource programs are controlled by a system administrator defining which resource programs are members of which domain program. A resource program can be configured to be the member of a set of domain programs. For example, resource program 216 is configured to be the member of domain programs 210 and 214. Resource program 218 is also configured to be the member of domain programs 210 and 214. In this embodiment of the invention, domain program 210 can only initiate requests to resource programs 216 and 218 that are defined to be members of domain program 210.

According to one embodiment of the invention, each of domain programs 210, 212 and 214 maintains information in a database that indicates which of the currently running resource programs 216, 218 and 220 are members of that domain program. Maintaining the database in each of domain programs 210, 212 and 214 is required so that the domain program can determine which of the requests from the user application programs can be forwarded to resource programs 216, 218 and 220.

Figure 3:
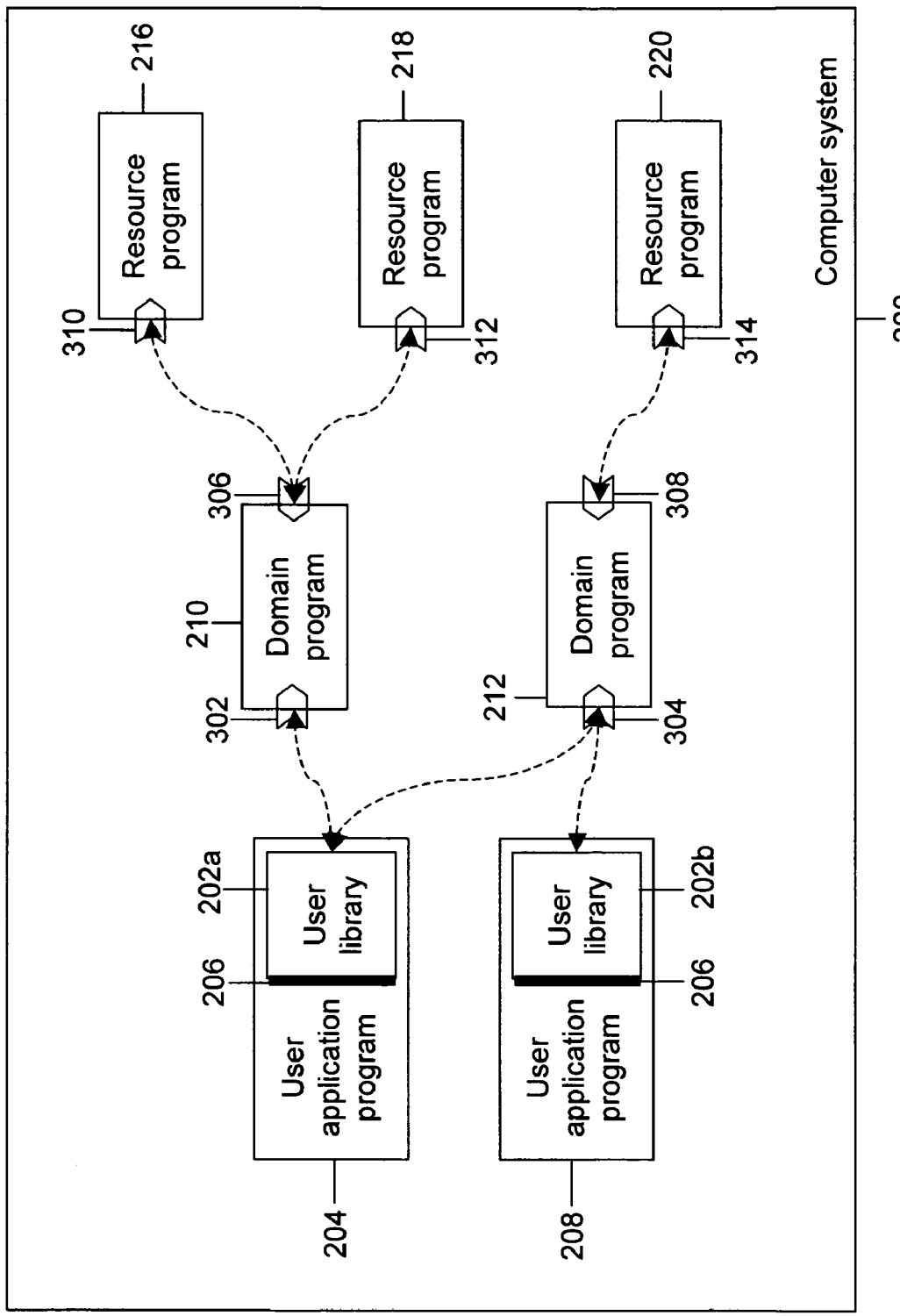
FIG. 3 is a view that illustrates communication among various programs running on a computer system for implementing the HPI specifications, in accordance with an embodiment of the invention.

FIG. 3 is a view that illustrates communication among various programs running on computer system 200 for implementing the HPI specifications, in accordance with an embodiment of the invention. Examples of the programs may include user library 202a, domain program 210, resource programs 216 and 218. The communication among various programs is implemented by an interface on each program. Each interface handles request/response traffic. Each program sends a request to communicate with other program on the interface and receives a response on the interface corresponding to the request. There are two distinct types of interfaces provided. A first type of interface is HPI 206 used by user application programs 204 and 208 to link with user libraries 202a and 202b respectively. Second types of interfaces are portals initiated on domain programs 210 and 212, and resource programs 216, 218 and 220. The portals are used by domain programs 210 and 212 and resource programs 216, 218 and 220 to communicate with each other. The portals are also used by domain programs 210 and 212 to communicate with user libraries 202a and 202b. An operating system like operating system 106 (FIG. 1) provides means for communication among various programs of software. These means are generally called inter-process communication (IPC) mechanisms. The IPC mechanisms are used to implement the portals.

In an embodiment of the invention, the domain programs use the portals to enable the access restrictions. For example, while implementing software for a Linux operating system, the portals can be implemented as UNIX sockets. The operating system like Linux provides a native IPC mechanism that supports access restrictions. The native IPC mechanism is provided in the form of UNIX sockets. In an embodiment of the invention, if a first program running on computer system 200 needs to receive requests from a second program running on computer system 200, the first program creates a UNIX socket with a unique name and applies appropriate access restrictions that allow the second program to send messages to that socket. The second program sends a request to the first program by sending messages to the named socket created by the first program. If the second program has permission to send messages to that socket, the first program receives the request and processes it. After processing the request, the first program sends a response to the second program using a UNIX socket created by the second program for the purpose of sending the request and receiving responses. If the second program does not have permission to send messages to the named socket created by the first program, then the request will not be delivered, and the request will not be processed by the first program.

The access restrictions as described above can be defined on a user-request portal 302 of domain program 210 to restrict the pre-defined set of user application programs to access domain program 210. User-request portal 302 is created by domain program 210 at the time of starting the execution. User-request portal 302 can be configured to accept messages only from the pre-defined set of user application programs having specific OS user identification numbers (ID's) or a group of OS user IDs. An OS user ID represents a unique identification for a program. In an embodiment of the invention, the pre-defined set of user application programs can include user application program 204. Therefore, user-request portal 302 is configured to accept messages only from user application program 204. So if user application program 208 makes a call to domain program 210, user application program 208 will receive a return data containing an error message. The error message communicates to user application program 208 that domain program 210 is not available for user application program 208. In another embodiment of the invention, a user-request portal 304 of domain program 212 can be configured to accept messages from a different set of user application programs. For example, user-request portal 304 can be configured to accept messages from user application programs 204 and 208.

Similar named portals are used by domain programs and resource programs to facilitate sending of requests and responses between domain and resource programs. According to an embodiment of the invention, a resource-request portal 306 and a resource-request portal 308 are created by domain programs 210 and 212 respectively. Resource-request portals 306 and 308 are used to allow resource programs 216, 218 and 220 to make requests of domain programs 210 and 212. Also, in an embodiment of the invention, a domain-request portal 310, a domain-request portal 312, and a domain-request portal 314 are created by resource programs 216, 218, and 220 respectively. Domain-request portals 310, 312 and 314 are used to allow domain programs 210 and 212 to make requests of resource programs 216, 218 and 220. These portals are normally given OS-specific access restrictions such that only domain programs and resource programs can send messages to these portals; no user application programs or user libraries can send messages to these portals. Because of this, user application programs can access resource programs only indirectly by making a request to a domain program, and letting that domain program forward the request on to a resource program. Resource-request portals 306 and 308, and domain-request portals 310, 312 and 314 can be configured to accept messages only from a single OS user ID, and this OS user ID is used for running all domain programs and resource programs. This OS user ID is not configured to allow logins. Thus, no user application programs can directly communicate to resource programs 216, 218 and 220. User application programs 204 and 208 can access resource programs 216, 218 and 220 through domain programs 210 and 212 only.

In an embodiment of the invention, user library 202a can accept calls from user application program 204. These calls may be made for establishing a management context, terminating a management context, and accessing domain program 210. For establishing a management context with domain program 210, as required by the call made by user application program 204, user library 202a can communicate a message to domain program 210. In an embodiment of the invention, the message is communicated to domain program 210, if this is for the first time that user library 202a has been called to establish a management context with domain program 210. If domain program 210 responds to the message, user library 202a communicates a session-identification entity, hereinafter referred to as session-id, to user application program 204. The session-id represents the management context established with the domain program 210. User library 202a may store the information about the management context being established with domain program 210 in its internal database.

The management context between domain program 210 and user application program 204 can be established by the means of a programming function. In an embodiment of the invention, user library 202a provides a set of 'C' programming functions that user application program 204 can call through HPI 206. The format of these programming functions is described by the HPI specifications. User library 202a can be an example of standard HPI library as defined in the HPI specifications. As defined in the current HPI specifications there are 79 separate programming functions that user application program 204 can call. Each programming function is passed with pre-defined parameters and returned with data from user library 202a. When user application program 204 needs to access user library 202a, user application program 204 makes a call to user library 202a through HPI 208. The call corresponds to a programming function saHpiSesionOpen( ). A domain identification entity, hereinafter referred as domain-id, is passed along with the saHpiSessionOpen( ) function. The domain-id corresponds to domain program 210, which user application program 204 needs to access. For example, in the Linux OS implementation, a domain-id '0210' can be associated with domain program 210. User-request portal 302 is created with a name in the OS file system that includes '0210' and can be identified based on this name. User library 202a returns the session-id in response to the call. After receiving the session-id successfully, the management context between user application program 204 and domain program 210 is established.

After establishing the management context with domain program 210, access of domain program 210 can be provided to user application program 204. Subsequent calls made by user application program 204 to user library 202a include the session-id. The access to domain program 210 may be required for accessing a set of management data and a set of management capabilities associated with resource program 216. User application program 204 communicates the session-id to user library 202a to inform about the management context established with domain program 210. User library 202a looks for the session-id in its internal database and determines that user application program 204 needs to access domain program 210. Domain program 210 has previously initiated user-request portal 302 with a name that can be used to identify domain program 210. In response to the call, user library 202a sends a request to user-request portal 302 of domain program 210. The request is generated for domain program 210 based on the session-id. When domain program 210 completes processing the request, it can send a response back to user application program 204 via a reverse path between user-request portal 302 and user library 202a. The response is read by user library 202a and translated to an appropriate data to be returned to the programming function called by user application program 204. Likewise domain program 212 has user-request portal 304 for receiving requests from user library 202b. The requests are sent by user library 202b in response to the calls made by user application program 208.

According to one embodiment of the invention, user application program 204 can send requests to each of domain programs 210 and 212 through user library 202a. The requests can be sent by calling saHpiSessionOpen( ) twice and receiving multiple session-ids returned by user library 202a. The multiple session-ids correspond to domain programs 210 and 212. In an embodiment of the invention, domain programs 210 and 212 can accept requests from multiple user application programs. The multiple user application programs include user application programs 204 and 208.

As described above, user library 202a communicates a request message in response to the call made by user application program 204 to domain program 210. The request message may include information corresponding to the set of management data and the set of management capabilities included in resource program 216. The information may be in the form of the pre-defined parameters included in a programming function out of the 79 programming functions currently defined in the HPI specifications. Domain program 210 provides access to the set of management data and the set of management capabilities by generating a second request from domain program 210 to resource program 216. According to one embodiment of the invention, resource program 216 can decode the request for identifying the set of management data and the set of management capabilities that are required to be accessed. When resource program 216 completes processing the request, it sends a response back to domain program 210, which then sends a response back to user library 202a. When a response to the request message arrives from domain program 210, user library 202a receives the response and communicates it to user application program 204. If access to the set of management data and the set of management capabilities by accessing resource program 216 is successful, the response may contain a return code that contains information about the success of the access and a set of return data. The set of return data may contain information corresponding to the set of management data and the set of management capabilities. If the access to the set of management data and the set of management capabilities fails to succeed, the response may contain the return code containing information about the failure of access.

In accordance with an embodiment of the invention, the management context may need to be terminated with domain program 210 once the user application program 204 receives a response to the request. User library 202a can terminate the management context of the user application program 204 with domain program 210, if the call indicates that the management context is to be terminated. User library 202a removes the session-id that represents the management context, on the termination of the management context.

In an embodiment of the invention, any of zero or more user libraries, zero or more domain programs, zero or more resource programs and zero or more bridge programs can be configured to run simultaneously on a computer system. The bridge programs can provide access of domain programs and resource programs running on remotely-connected computer systems to user application programs, thereby providing the management capabilities associated with the resource programs running on the remotely-connected computer systems.

Figure 4:
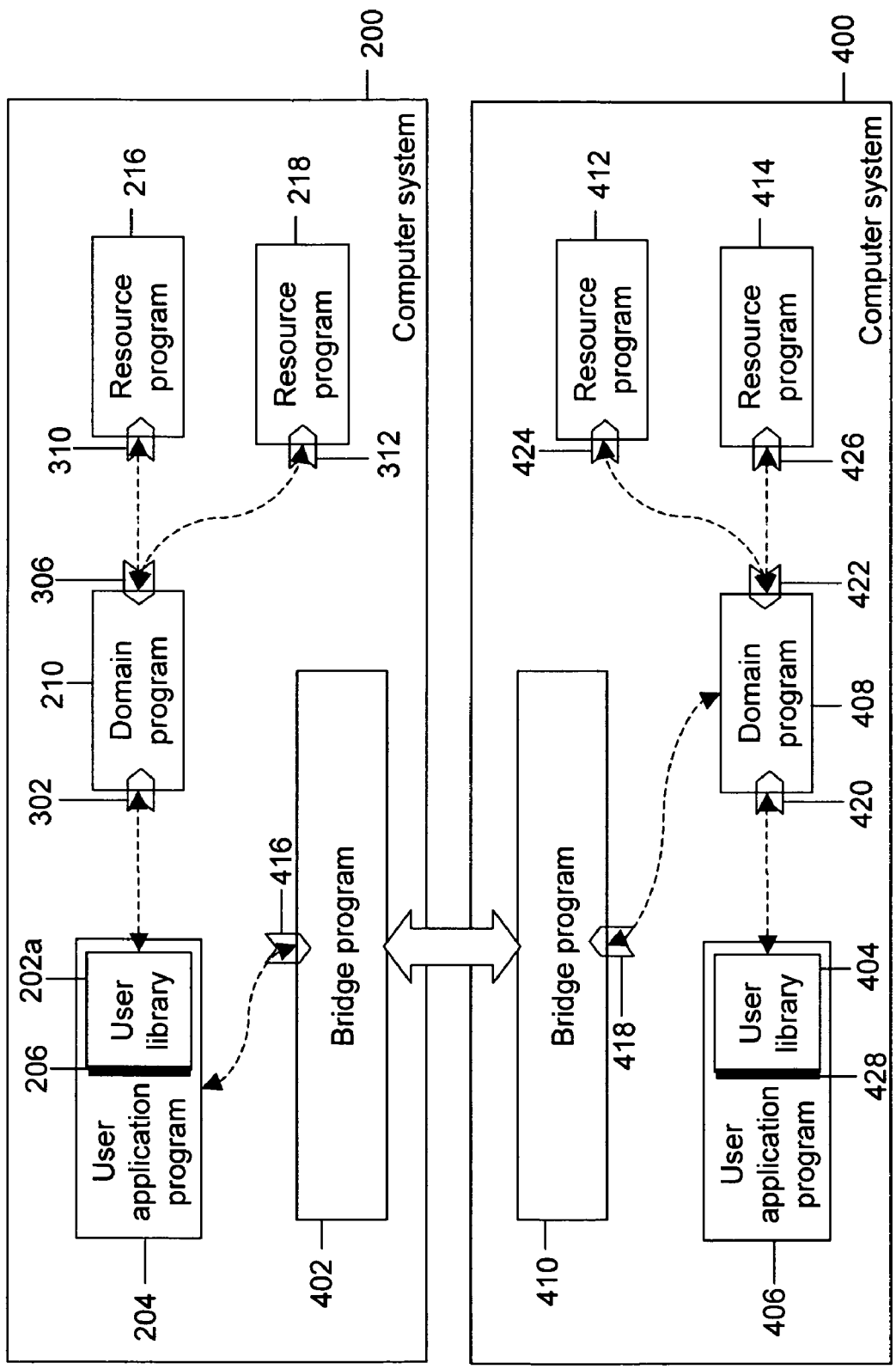
FIG. 4 is a view that illustrates a schematic representation of various programs, for implementing the HPI specifications, in two remotely-connected computer systems, in accordance with an embodiment of the invention.

FIG. 4 is a view that illustrates a schematic representation of various programs, for implementing the HPI specifications, in two remotely-connected computer systems, in accordance with an embodiment of the invention. Examples of the network may include Ethernet, Internet Protocol (IP) network or a wireless network. The two remotely-connected computer systems are computer system 200 and a computer system 400. Computer system 200 includes user application program 204 linked with user library 202a, a domain program 210, resource programs 216 and 218 and a bridge program 402. Bridge program 402 enables communication with remotely-connected computer systems. For example, computer system 400 is remotely connected with computer system 200. Computer system 400 includes a user library 404 linked with a user application program 406, a domain program 408, resource programs 412 and 414, and a bridge program 410. Domain program 408 can provide access to resource programs 412 and 414 as they are configured to be members of domain program 408. Here only a single user application program and a single domain program are shown running on computer systems 200 and 400 for simplicity. In an embodiment of the invention, multiple user application programs and multiple domain programs may be running on computer systems 200 and 400.

Bridge program 402 running on computer system 200 communicates with bridge program 410 to enable platform management of remotely-connected computer systems 200 and 400. In an embodiment of the invention, bridge programs 402 and 410 can communicate using Internet protocol (IP) communication mechanisms. For example, in a Linux implementation of the software, User Datagram Protocol/Internet Protocol (UDP/IP) messages can be used to communicate between bridge programs 402 and 410.

According to an embodiment of the invention, communication between the programs running on computer system 200 and bridge program 402 can be enabled by creating a bridge portal 416 on bridge program 402. Bridge portal 416 provides means for OS-specific inter-process communication. Bridge program 402 may apply access restrictions on bridge portal 416 at the time of starting the execution. In a similar way, bridge program 410 can initiate a bridge portal 418 while starting the execution. The access restrictions on bridge portal 416 allow only selected programs running on computer system 200 to access bridge program 410. In an embodiment of the invention, the access restrictions can be defined such that only user application program 204 of the multiple user application programs, and domain program 210, resource programs 216 and 218 can access bridge program 402. In another embodiment of the invention, the access restrictions can also be defined such that no user application programs and only domain program 210 and resource programs 216 and 218 can access bridge program 402.

When a program running on computer system 200 needs to communicate with a program running on a remotely-connected computer system, the program running on computer system 200 sends a message to bridge program 402. Examples of the program running on computer system 200 may include user application program 204, domain program 210, resource programs 216 and 218. Bridge program 402 identifies the remotely-connected computer system which has the program running. Bridge program 402 then forwards the message to a bridge program running on the remotely-connected computer system. For example, in the embodiment of the invention shown in FIG. 4, if user application program 204 needs to communicate with resource program 414, it must communicate through domain program 408. To send a request to domain program 408, user application program 204 sends a message to bridge program 402. Bridge program 402 determines that computer system 400 has domain program 408 running. Bridge program 402 then sends the message to bridge program 410 running on computer system 400. Bridge program 410 can forward the message to domain program 408. Domain program 408 can send a request to resource program 414 on behalf of user application program 204.

In an embodiment of the invention, two levels of secure communication can be configured while setting up the software for implementing the HPI specifications, on the network of remotely-connected computer systems. In the first level, individual peer-to-peer communication links are defined between bridge programs 402 and 410. The individual peer-to-peer communication links make it possible to allow or block communication between programs running on computer system 200 and programs running on computer system 400. Examples of the programs running on computer system 400 may be user application program 406, domain program 408, and resource programs 412 and 414. In the second level, bridge portals 416 and 418 can have similar access restrictions as defined for user-request portal 302. Using OS specific inter-process communication mechanisms and access restrictions defined therein, it is possible to restrict which of user application programs running on computer system 200 may communicate with bridge program 402. This access restriction may be desirable since a user application program having access to bridge program 402 can access all domain programs running on computer system 400. In case there were multiple domain programs running on computer system 400, user application program 204 could access the multiple domain programs running on computer system 400.

In an embodiment of the invention, bridge program 410 can manage requests to access domain program 408 and resource programs 412 and 414. The requests may be generated by one or more of user application program 204, domain program 210 and resource programs 216 and 218 and communicated by bridge program 402. When a program running on computer system 200 needs to send a request to a program running on computer system 400, the program running on computer system 200 will not find an appropriate portal in computer system 200, because the appropriate portal belongs to the program running on computer system 400. The program running on computer system 200 can then encapsulate a request for accessing the program running on computer system 400 with a header, and send the request to bridge program 402. The header can include the information to identify the name of the portal existing on computer system 400 to receive the request. Bridge program 402 receives the encapsulated request and observes an internal database to identify an appropriate peer bridge program. This appropriate bridge program should be able to communicate the encapsulated request to the requested named portal. Bridge program 402 uses the information contained in the header to identify the appropriate bridge program. In an embodiment of the invention, the appropriate bridge program can be bridge program 410 as the program running on computer system 200 requires accessing the program running on computer system 400, via a portal defined on computer system 400. Bridge program 402 can forward the encapsulated request to bridge program 410, if it is identifiable by bridge program 402. Bridge program 410 can communicate the encapsulated request to the appropriate named portal existing on computer system 400.

In another embodiment of the invention, if bridge program 410 is not identifiable by bridge program 402 as being the appropriate bridge program to forward a request to specific portal, it can broadcast the encapsulated request to all known peer bridge programs running on other remotely-connected computer systems. Further, if a bridge program running on another remotely-connected computer system responds to the encapsulated request that was broadcast, bridge program 402 identifies and updates the internal database with the bridge program that responds to the encapsulated request. The bridge program can identify the program running on another remotely-connected computer system by analyzing the information contained in the header. Thereafter, the bridge program can communicate the encapsulated request to the identified program running on another remotely-connected computer system.

Figure 5:
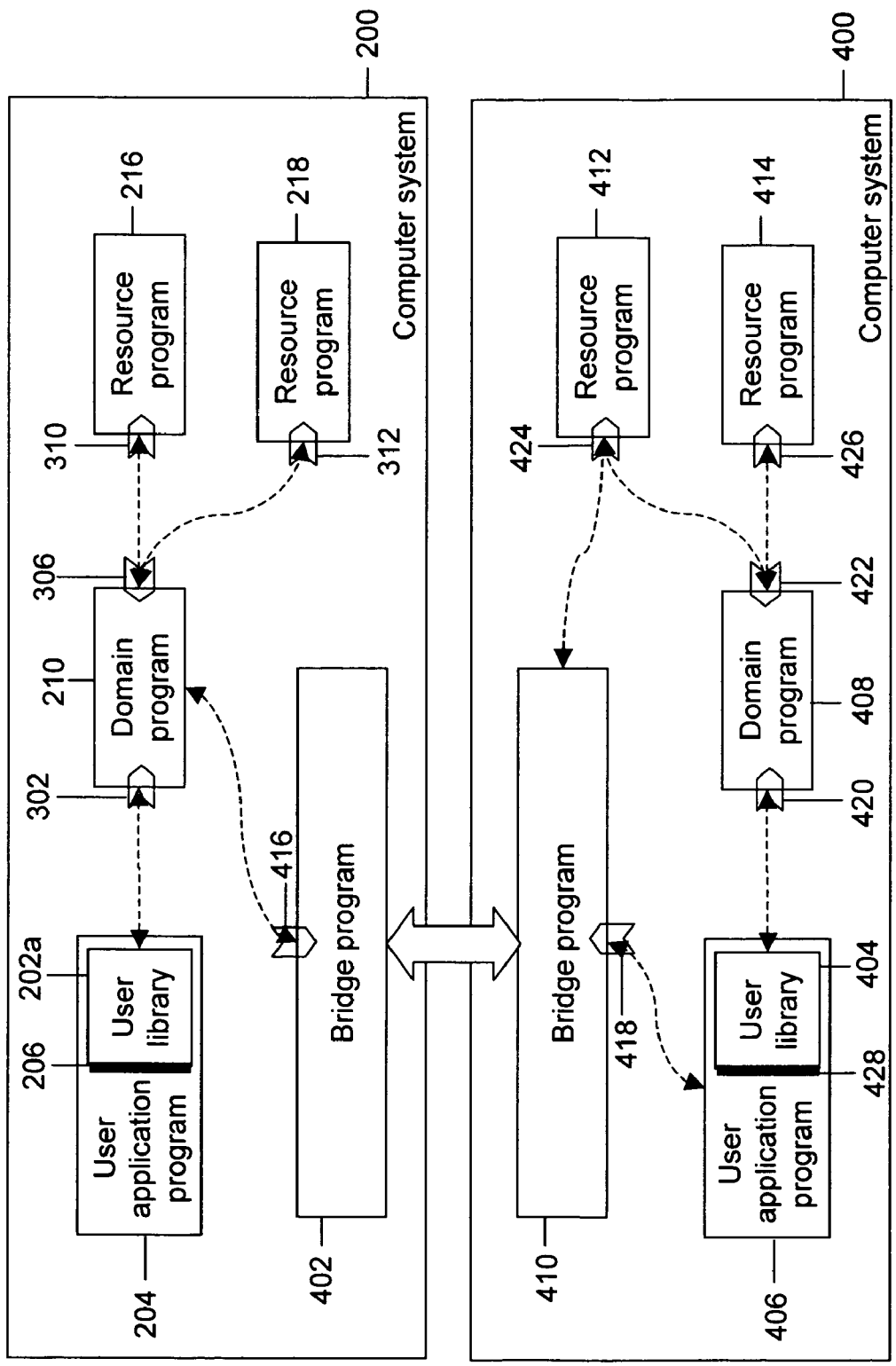
FIG. 5 is a view that illustrates communication among various programs, running on a computer system and a remotely-connected computer system, in accordance with an embodiment of the invention.

FIG. 5 is a view that illustrates communication among various programs running on computer system 200 and remotely-connected computer system 400 by means of bridge programs 402 and 410. When user application program 406 needs to access resource program 218, it must communicate via a domain program that includes resource program 218 as a member. In one embodiment of the invention, domain program 210 is used for the same. Because domain program 210 is not present on computer system 400, user application program 406 sends a request to bridge program 410. Bridge program 410 communicates the request to bridge program 402. Bridge program 402 forwards the request to domain program 210, which has resource program 218 configured as its member. Thus user application program 406 running on computer system 400 is provided access to resource program 218 running on computer system 200.

According to one embodiment of the invention, if user application program 204 is not allowed access to bridge program 402, user application program 204 can still access resource programs 412 and 414 running on computer system 400. User application program 204 communicates with domain program 210, and domain program 210 can provide access to resource programs 412 and 414. Resource programs 412 and 414 can be defined as members of domain program 210 and then user application program 204 can access them through domain program 210. For example, domain program 210 communicates a request for communication with resource program 412 to bridge program 402. Bridge program 402 forwards the request to bridge program 410, which then forwards it to resource program 412.

In an embodiment of the invention, the one or more user libraries, the zero or more resource programs, the zero or more domain programs and the bridge program can be implemented by a running instance of each of them. The running instance can be configured in a way that the instance is capable of starting and stopping execution independently of other instances.

Various embodiments of the invention provide the advantage of allowing dynamic configuration of domains and resources as defined in the HPI specification. The dynamic configuration is allowed by starting and stopping the execution of domain and resource programs independently. In an embodiment of the invention, bridge programs may be configured to accept requests only from domain programs and resource programs not from user application programs, thereby restricting the user application programs to access only domain programs running on the same computer system. Moreover, domain programs can create portals for inter-process communication that are accessible only by pre-defined user application programs. Thereby, the access to user application programs of the management data and management capabilities is restricted by restricting access to the domain programs. Embodiments of the invention also have the advantage that user application programs are allowed access to the set of management data and the set of management capabilities by accessing the domain programs only.

Further, embodiments of the invention provide a mechanism that allows the resource programs to be distributed over a network, running on remotely-connected computer systems. The user application programs may be provided access to the resource programs by bridge programs. Yet, the user application programs can access the resource programs only when they have access to the domain programs that have those resource programs defined as members of the domain.

Embodiments of the invention also provide the advantage that the relationship between domain programs and resource programs running on various remotely-connected computer systems can be configured independently of the security configuration over the network. The bridge programs can be configured with security restrictions appropriate for network communication. For example, communication through the bridge programs can be restricted only to private local area network (LAN) interfaces. Further, communications through the bridge programs may be restricted to route through Virtual Private Network (VPN) interfaces. Furthermore, communications through the bridge programs may be restricted only through specific peer Internet Protocol (IP) addresses.

In accordance with an embodiment of the invention, the bridge program may create a database that contains information about the domain programs and the resource programs running on remotely-connected computer systems. By using the database the bridge program can enable communication between the user application programs, domain programs and resource programs running on remotely-connected computer system as if they were running on the same computer system. In this way, the domain programs and the resource programs can dynamically reconfigure their connections by using the connectivity with domain programs and resource programs running anywhere in the network. Therefore, embodiments of the invention provide the advantage of platform management of high-availability computer systems that are a specific target for HPI implementation and should support dynamic configuration to deal with operation in case of system faults.

Embodiments of the invention also provide the advantage that OS-specific inter-process communications are used for communication between HPI processes running on the same computer systems. This results in low overhead in communication between the HPI processes.

While the foregoing is directed to embodiments of the invention, other and further embodiments of the invention may be devised without departing from the basic scope thereof, and the scope thereof is determined by the claims that follow.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

Although the invention has been discussed with respect to specific embodiments thereof, these embodiments are merely illustrative, and not restrictive, of the invention.

A "computer program product" for purposes of embodiments of the invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Any suitable programming language can be used to implement the routines of the invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as Digital Signal Processing etc. The routines can operate in audio encoding environment or as stand-alone routines occupying all, or a substantial part, of the system processing.

What is claimed is:

1. A computer program product, the computer program product comprising a non-transitory computer readable medium including computer program code for platform management of computer systems in accordance with the Hardware Platform Interface (HPI) specifications provided by the Service Availability Forum (SAF), the computer program code comprising instructions for:
   a) a user library, wherein zero or more instances of the user library being configurable to be present on one or more computer systems, each instance of the user library accepting HPI calls from user application programs;
   b) a resource program, wherein zero or more instances of the resource program being configurable to run on the one or more computer systems, each running instance of the resource program providing access to zero or more of a set of management data and a set of management capabilities, the access being provided via access restrictions to a set of running instances of a domain program directly, and to the user application programs indirectly through the set of the running instances of the domain program;
   c) a domain program, wherein zero or more instances of the domain program being configurable to run on the one or more computer systems, each running instance of the domain program providing access of a set of the running instances of the resource program to a pre-defined set of user application programs, the set of the running instances of the resource program being configured as the members of the running instance of the domain program, and the access to the pre-defined set of user application programs being provided based on access restrictions defined for the running instance of the domain program; and
   d) a bridge program, wherein zero or more instances of the bridge program being configurable to run on the one or more computer systems, each running instance of the bridge program enabling communication with zero or more remotely-connected computer systems.

2. The computer program product according to claim 1, wherein each of the zero or more instances of the user library, the zero or more instances of the resource program, the zero or more instances of the domain program, and the zero or more instances of the bridge program being configurable to start and stop the execution independently of each other.

3. The computer program product according to claim 2, wherein the zero or more instances of the user library, the zero or more instances of the resource program, the zero or more instances of the domain program, and the zero or more instances of the bridge program communicating amongst each other by operating system (OS) specific inter-process communication mechanisms.

4. The computer program product according to claim 1, wherein the user library comprises:
   a) instruction means for establishing a management context of a user application program with the running instance of the domain program;
   b) instruction means for providing access to the running instance of the domain program on an established management context, the access to the running instance of the domain program being required for accessing the zero or more of the set of management data and the set of management capabilities, the set of management data and the set of management capabilities being associated with one of the set of the running instances of the resource program; and
   c) instruction means for terminating the management context with the domain program.

5. The computer program product according to claim 4, wherein the instruction means for establishing the management context comprises:

a) instruction means for communicating a message to the running instance of the domain program for establishing the management context;

b) instruction means for communicating a session identification entity to the user application program if the running instance of the domain program responds to the message, the session identification entity representing the management context; and c) instruction means for storing the session identification entity and the association between the session identification entity and the running instance of the domain program in the user library.

6. The computer program product according to claim 4, wherein the instruction means for providing the access to the running instance of the domain program comprises:

a) instruction means for identifying the running instance of the domain program that the user application program requires to access by observing a session identification entity representing the established management context;

b) instruction means for communicating a request message to the running instance of the domain program, the request message comprising one or more parameters containing information about the zero or more of the set of management data and the set of management capabilities;

c) instruction means for receiving a response from the running instance of the domain program, the response containing one or more of a return code and a set of return data, the return code containing information about one of a success and a failure in response to the request message; and d) instruction means for returning one or more of the return code and the set of return data to the user application program in response to the HPI call for providing the access.

7. The computer program product according to claim 4, wherein the instruction means for terminating the management context comprises instruction means for removing a session identification entity from the user library, the session identification entity representing the management context.

8. The computer program product according to claim 1, wherein the resource program comprises:

a) instruction means for creating a portal for OS specific inter-process communication for each running instance of the resource program;

b) instruction means for configuring the running instance of the resource program to be the member of the set of the running instances of the domain program; and c) instruction means for processing a request for accessing the zero or more of the set of management data and the set of management capabilities, the request being made by the running instance of the domain program.

9. The computer program product according to claim 8, wherein the instruction means for processing the request comprises:

a) instruction means for decoding the request for identifying the zero or more of the set of management data and the set of management capabilities; and b) instruction means for sending one or more of a return code and a set of return data to the running instance of the domain program in response to the request.

10. The computer program product according to claim 1, wherein the domain program comprises:

a) instruction means for creating one or more portals for OS specific inter-process communication, the one or more portals having access restrictions defined for each running instance of the domain program, the access restrictions allowing only the pre-defined set of user application programs to send request messages to the one or more portals; and b) instruction means for maintaining a database within the running instance of the domain program, the database indicating which of the set of the running instances of the resource program are configured to be the members of the running instance of the domain program.

11. The computer program product according to claim 1, wherein the bridge program comprises:

a) instruction means for communicating with any of the zero or more instances of the user library, the zero or more instances of the resource program and the zero or more instances of the domain program, the zero or more instances of the user library, the zero or more instances of the resource program and the zero or more instances of the domain program running on the same computer system;

b) instruction means for communicating with zero or more instances of the bridge program running on the zero or more remotely-connected computer systems; and instruction means for managing requests for accessing one of a running instance of a resource program and a running instance of a domain program running on the remotely-connected computer system.

12. The computer program product according to claim 11, wherein the instruction means for communicating with any of the zero or more instances of the user library, the zero or more instances of the resource program and the zero or more instances of the domain program comprises:

a) instruction means for creating a portal for OS specific inter-process communication for each running instance of the bridge program; and b) instruction means for applying access restrictions on the portal for accessing the running instance of the bridge program.

13. The computer program product according to claim 11, wherein the instruction means for managing requests for accessing the one of the running instance of the resource program and the running instance of the domain program:

a) instruction means for receiving a request encapsulated with a header, the header comprising information for identifying the one of the running instance of the resource program and the running instance of the domain program;

b) instruction means for identifying an appropriate running instance of the bridge program from the zero or more instances of the bridge program running on the zero or more remotely-connected computer systems, the appropriate running instance of the bridge program being capable of communicating the encapsulated request to the one of the running instance of the resource program and the running instance of the domain program; and c) instruction means for forwarding the encapsulated request to the appropriate running instance of the bridge program if the appropriate running instance of the bridge program is identified in a database in the running instance of the bridge program.

14. The computer program product according to claim 11, wherein the instruction means for managing requests for accessing the one of the running instances of the resource program and the domain program:

a) instruction means for broadcasting the encapsulated request to each of the zero or more instances of the bridge program running on the zero or more remotely-connected computer systems if the appropriate running instance of the bridge program is not identified in a database in the running instance of the bridge program; and b) instruction means for identifying an instance of the bridge program responding to the encapsulated request, the instance of the bridge program belonging to the zero or more instances of the bridge program running on the zero or more remotely-connected computer systems.

15. A computer program product, the computer program product comprising a non-transitory computer readable medium including computer program code for platform management of computer systems in accordance with the Hardware Platform Interface (HPI) specifications provided by the Service Availability Forum (SAF), the computer program code comprising instructions for:

a) a user library, wherein zero or more instances of the user library being configurable to be present on one or more computer systems, each instance of the user library accepting HPI calls from user application programs, the user library comprising:
  i. instruction means for establishing a management context of a user application program with the running instance of the domain program;
  ii. instruction means for providing access to the running instance of the domain program on an established management context, the access to the running instance of the domain program being required for accessing the zero or more of the set of management data and the set of management capabilities, the set of management data and the set of management capabilities being associated with one of the set of the running instances of the resource program; and
  iii. instruction means for terminating the management context with the domain program;

b) a resource program, wherein zero or more instances of the resource program being configurable to run on the one or more computer systems, each running instance of the resource program providing access to zero or more of a set of management data and a set of management capabilities, the access being provided via access restrictions to a set of running instances of a domain program directly, and to the user application programs indirectly through the set of the running instances of the domain program, the resource program comprising:
  i. instruction means for creating a portal for OS specific inter-process communication for each running instance of the resource program;
  ii. instruction means for configuring the running instance of the resource program to be the member of the set of the running instances of the domain program; and
  iii. instruction means for processing a request for accessing the zero or more of the set of management data and the set of management capabilities, the request being made by the running instance of the domain program;

c) a domain program, wherein zero or more instances of the domain program being configurable to run on the one or more computer systems, each running instance of the domain program providing access of a set of the running instances of the resource program to a pre-defined set of user application programs, the set of the running instances of the resource program being configured as the members of the running instance of the domain program, and the access to the pre-defined set of user application programs being provided based on access restrictions defined for the running instance of the domain program, the domain program comprising:
  i. instruction means for creating one or more portals for OS specific inter-process communication, the one or more portals having access restrictions defined for each running instance of the domain program, the access restrictions allowing only the pre-defined set of user application programs to send request messages to the one or more portals; and
  ii. instruction means for maintaining a database within the running instance of the domain program, the database indicating which of the set of the running instances of the resource program are configured to be the members of the running instance of the domain program; and d) a bridge program, wherein zero or more instances of the bridge program being configurable to run on the one or more computer systems, each running instance of the bridge program enabling communication with zero or more remotely-connected computer systems, the bridge program comprising:
  i. instruction means for communicating with any of the zero or more instances of the user library, the zero or more instances of the resource program and the zero or more instances of the domain program, the zero or more instances of the user library, the zero or more instances of the resource program and the zero or more instances of the domain program running on the same computer system;
  ii. instruction means for communicating with zero or more instances of the bridge program running on the zero or more remotely-connected computer systems; and
  iii. instruction means for managing requests for accessing one of a running instance of a resource program and a running instance of a domain program running on the remotely-connected computer system.

16. A system for platform management of computer systems in accordance with the Hardware Platform Interface (HPI) specifications provided by Service Availability Forum (SAF), the system comprising:

a computing device, including a processor, the processor executing instructions configured to provide:

a) a user library, wherein zero or more instances of the user library being configurable to be present on one or more computer systems, each instance of the user library accepting HPI calls from user application programs;

b) a resource program, wherein zero or more instances of the resource program being configurable to run on the one or more computer systems, each running instance of the resource program providing access to zero or more of a set of management data and a set of management capabilities, the access being provided via access restrictions to a set of running instances of a domain program directly, and to the user application programs indirectly through the set of the running instances of the domain program;

c) a domain program, wherein zero or more instances of the domain program being configurable to run on the one or more computer systems, each running instance of the domain program providing access of a set of the running instances of the resource program to a pre-defined set of user application programs, the set of the running instances of the resource program being configured as the members of the running instance of the domain program, and the access to the pre-defined set of user application programs being provided based on access restrictions defined for the running instance of the domain program; and d) a bridge program, wherein zero or more instances of the bridge program being configurable to run on the one or more computer systems, each running instance of the bridge program enabling communication with zero or more remotely-connected computer systems.

17. A method for enabling platform management of computer systems in accordance with the Hardware Platform Interface (HPI) specifications provided by Service Availability Forum (SAF), the method comprising:
   a) accepting HPI calls from user application programs;
   b) providing access to zero or more of a set of management data and a set of management capabilities by a running instance of a resource program, the access being provided via access restrictions only to a set of running instances of a domain program directly, and to the user application programs only indirectly through the set of the running instances of the domain program;
   c) providing access of a set of running instances of the resource program to a pre-defined set of user application programs by a running instance of the domain program, the set of the running instances of the resource program being configured as the members of the running instance of the domain program, and the access to the pre-defined set of user application programs being provided based on access restrictions defined for the running instance of the domain program; and
   d) enabling communication with zero or more remotely-connected computer systems.

* * * * *